(12) United States Patent
Ng

(10) Patent No.: US 8,608,098 B2
(45) Date of Patent: Dec. 17, 2013

(54) CONDIMENT GRINDER

(75) Inventor: Hong Wo Ng, Tsing Yi (HK)

(73) Assignee: Wing Wo Plastic Manufactory Limited, Tsuen Wan (HK)

( * ) Notice: Subject to any disclaimer, the term of this patent is extended or adjusted under 35 U.S.C. 154(b) by 408 days.

(21) Appl. No.: 12/972,660

(22) Filed: Dec. 20, 2010

(65) Prior Publication Data

US 2012/0153060 A1 Jun. 21, 2012

(51) Int. Cl.
*A47J 42/04* (2006.01)

(52) U.S. Cl.
USPC ........................................................ 241/169.1

(58) Field of Classification Search
USPC .................................................... 241/169.1
See application file for complete search history.

(56) References Cited

U.S. PATENT DOCUMENTS

| | | | | |
|---|---|---|---|---|
| 4,374,574 A | * | 2/1983 | David | 241/169.1 |
| 6,533,199 B2 | * | 3/2003 | Wu | 241/169.1 |
| 6,871,808 B2 | * | 3/2005 | Holcomb et al. | 241/169.1 |
| 7,207,511 B2 | * | 4/2007 | Ng | 241/101.3 |
| 8,241,553 B2 | * | 8/2012 | Stasin | 264/537 |
| 2005/0061898 A1 | * | 3/2005 | Whitmer | 241/169.1 |
| 2013/0015279 A1 | | 1/2013 | So | |

* cited by examiner

*Primary Examiner* — Mark Rosenbaum
(74) *Attorney, Agent, or Firm* — Leydig, Voit & Mayer, Ltd.

(57) ABSTRACT

A condiment grinder has a body for containing condiment seeds, a grinding mechanisms located at an open end of the body through which condiment seeds ground by the grinding mechanism may be dispensed, and a drive mechanism for turning an operating shaft of the grinding mechanism to operate the grinder. The grinding mechanism includes a female grinder and a male grinder, which is supported co-axially in the female grinder for rotation relative to the female grinder, for grinding condiment seeds. The two grinders are spaced apart by an annular gap in which condiment seeds are ground. The drive mechanism has an operator supported for reciprocating motion relative to the body, and a motion translator for translating the reciprocating motion into uni-directional rotary motion driving the operating shaft.

36 Claims, 19 Drawing Sheets

CONDIMENT GRINDER

The present invention relates to a condiment grinder and particularly, but not exclusively, to a pepper grinder.

BACKGROUND OF THE INVENTION

Pepper grinders of the type that employs a pair of co-axial inner and outer grinders as the grinding mechanism typically incorporate a turning knob for operating the grinding mechanism to provide a rotary grinding action. Such grinders require both hands for operation and this can be cumbersome on occasion, though grinding mechanisms of this type work most effectively.

There are also features that permit adjustment of the grinding size. The grinding mechanisms of relatively more sophisticated pepper grinders are usually adjustable so as to provide different grinding sizes. In a known construction of the rotary grinding type, the adjustment is enabled by a disc that can be turned like a dial by its rim, which is however inconvenient to use.

The invention seeks to mitigate or to at least alleviate one of more of these problems or shortcoming by providing a new or otherwise improved condiment grinder.

SUMMARY OF THE INVENTION

According to the invention, there is provided a condiment grinder comprising a body for containing condiment seeds, a grinding mechanism provided at an open end of the body through which condiment ground by the grinding mechanism may be dispensed, and a drive mechanism for turning the operating shaft to operate the grinding mechanism. The grinding mechanism comprises an operating shaft, a female grinder and a male grinder which is supported co-axially in the female grinder for rotation relative thereto for grinding condiment, the two grinders being spaced apart by an annular gap in which condiment is to be ground. The drive mechanism comprises an operator supported for reciprocating motion relative to the body, and a motion translator for translating the reciprocating motion into uni-directional rotary motion for the operating shaft.

Preferably, the motion translator comprises a rotary member in engagement with the operating shaft for simultaneous rotation and a slider reciprocated by the operator to turn the rotary member and hence the operating shaft.

More preferably, the slider is slidable along a substantially linear path.

More preferably, the slider is resiliently biased by a spring towards a normal position which corresponds to the operator being farthest away from the body.

More preferably, the rotary member comprises a wheel.

More preferably, the motion translator includes an intermediate member in engagement with and between the slider and the rotary member, the intermediate member being rotatable to transmit drive from the slider to the rotary member.

Further more preferably, the intermediate member has a centre of rotation and is, at an off-centre position thereof, in a sliding hinge engagement with the slider.

Yet further more preferably, the slider has a slot and the intermediate member has an off-centre pin in sliding engagement with the slot.

It is preferred that the intermediate member is rotatable about the same axis as the rotary member.

It is preferred that the intermediate member includes at least one pawl co-operable with the rotary member to hold and turn the rotary member in only one direction through a ratchet action.

It is further preferred that said at least one pawl is resiliently biased by a spring against the rotary member, the spring being located on or in the intermediate member.

It is further preferred that the intermediate member includes two said pawls on opposite sides of the rotary member for holding and turning the rotary member in a balanced manner.

It is preferred that the rotary member is located and supported for rotation within the intermediate member, together forming a unitary structure.

It is preferred that the condiment grinder includes a first ratchet between the operator and the intermediate member and a second ratchet between the intermediate member and the rotary member, the first and second ratchets being operable in opposite senses.

Preferably, the motion translator includes a ratchet to stop the rotary member turning in the opposite direction.

Preferably, the rotary member includes teeth for ratchet action.

In a preferred embodiment, the operator is supported for reciprocating pivotal motion to operate the grinding mechanism.

More preferably, the operator is pivotable towards and away from the body, staying in a normal position farthest from the body.

More preferably, the operator is pivotably connected to a closure that closes the body.

More preferably, the operator is hinged to the slider for sliding the slider.

Advantageously, the condiment grinder includes a lock provided between the body and the or a closure for the body for locking the closure closed.

In a preferred embodiment, the condiment grinder includes a base attached to the open end, that being a lower end, of the body for standing the body on a surface, the base being in engagement with one of the female and male grinders and being turnable to adjust the axial position of said one grinder relative to the other grinder and hence the width of the gap and in turn the condiment grinding size, the base having a peripheral portion that is exposed to and accessible from all lateral sides for gripping so that the base can conveniently be turned.

Preferably, the two grinders are both resiliently biased downwards, and the base is in engagement with said one grinder from below against the resilient bias acting upon it.

More preferably, the two grinders are resiliently biased downwards by respective coil springs.

In a preferred arrangement, the base is in engagement with the female grinder and is rotatable to cause movement thereof relative to the male grinder.

It is preferred that the peripheral portion comprises a cylindrical wall of the base.

In a preferred embodiment, the base comprises an annular outer member including the peripheral portion and an annular inner member surrounded by the outer member and engaging said one grinder, the inner member being axially movable through a cam action by the outer member upon turning.

More preferably, the outer and inner base members are in inter-engagement by screw thread means.

Further more preferably, the outer and inner base members have respective screw threads for inter-engagement, the screw threads including inter-engageable parts to define a plurality of predetermined angular positions for the base relative to the body.

Yet further more preferably, the inter-engageable parts comprise a protrusion and a series of recesses corresponding to the predetermined positions.

Conveniently, the base and the body include respective indicia to indicate the predetermined positions.

It is preferred that the base has four equiangular predetermined positions relative to the body.

It is preferred that the base is arranged to be turned relative to the body through an angle of about 90°.

In a preferred embodiment, the inner base member receives and supports the female grinder for movement relative to the male grinder.

Preferably, the outer base member includes an outer cylindrical wall providing the peripheral portion and an inner cylindrical wall in engagement with the inner base member.

In a preferred construction, a mount secured across the lower end of the body, which connects the base to the body and supports an operating shaft of the grinding mechanism in the body, the shaft engaging through the male grinder for rotating the same.

More preferably, the mount and the base have confronting cylindrical surfaces including a pair of aligned annular grooves that are inter-engaged by a ring.

It is preferred that the shaft has a lower end extending beyond the male grinder and supported by a bearing that is secured to the or an axially movable inner member of the base.

BRIEF DESCRIPTION OF DRAWINGS

The invention will now be more particularly described, by way of example only, with reference to the accompanying drawings, in which:

FIGS. 9 and 9A are a top perspective view and a cross-sectional side view of the grinding mechanism of FIG. 8, assembled;

DETAILED DESCRIPTION OF PREFERRED EMBODIMENT

Figure 1:
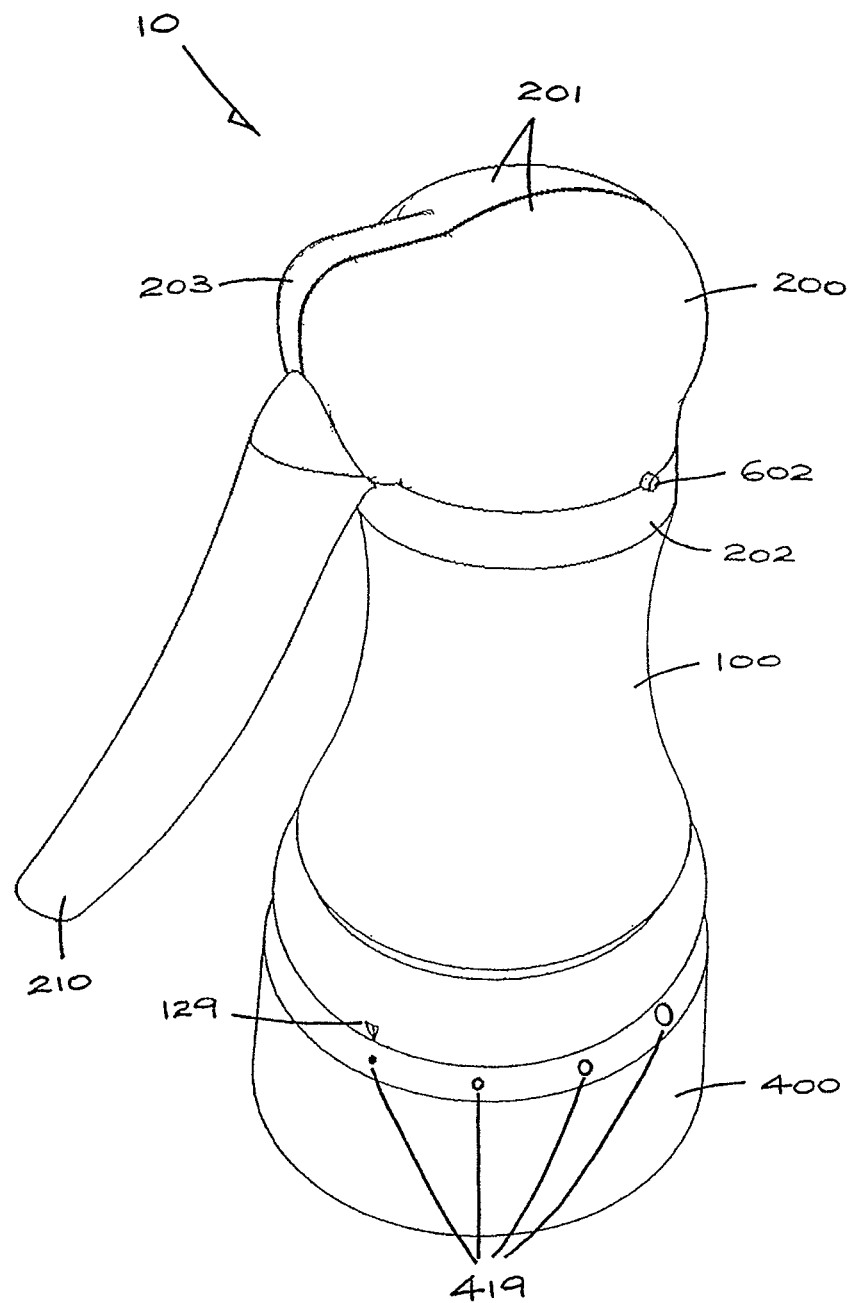
FIG. 1 is a top perspective view of an embodiment of a condiment grinder in accordance with the invention.
Figure 2:
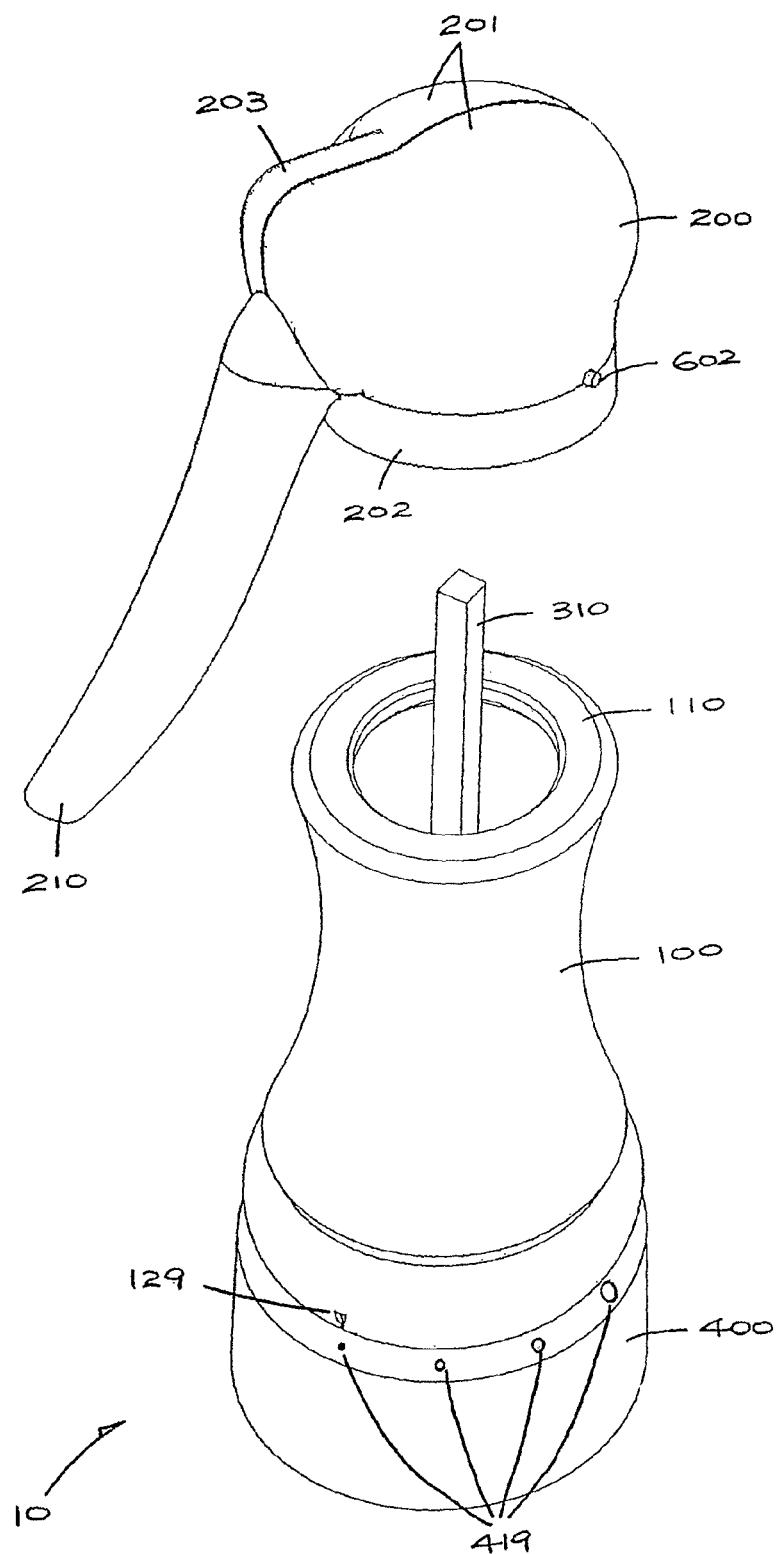
FIG. 2 is a top perspective view of the grinder of FIG. 1, showing a lid separated from a body with base thereof.
Figure 3:
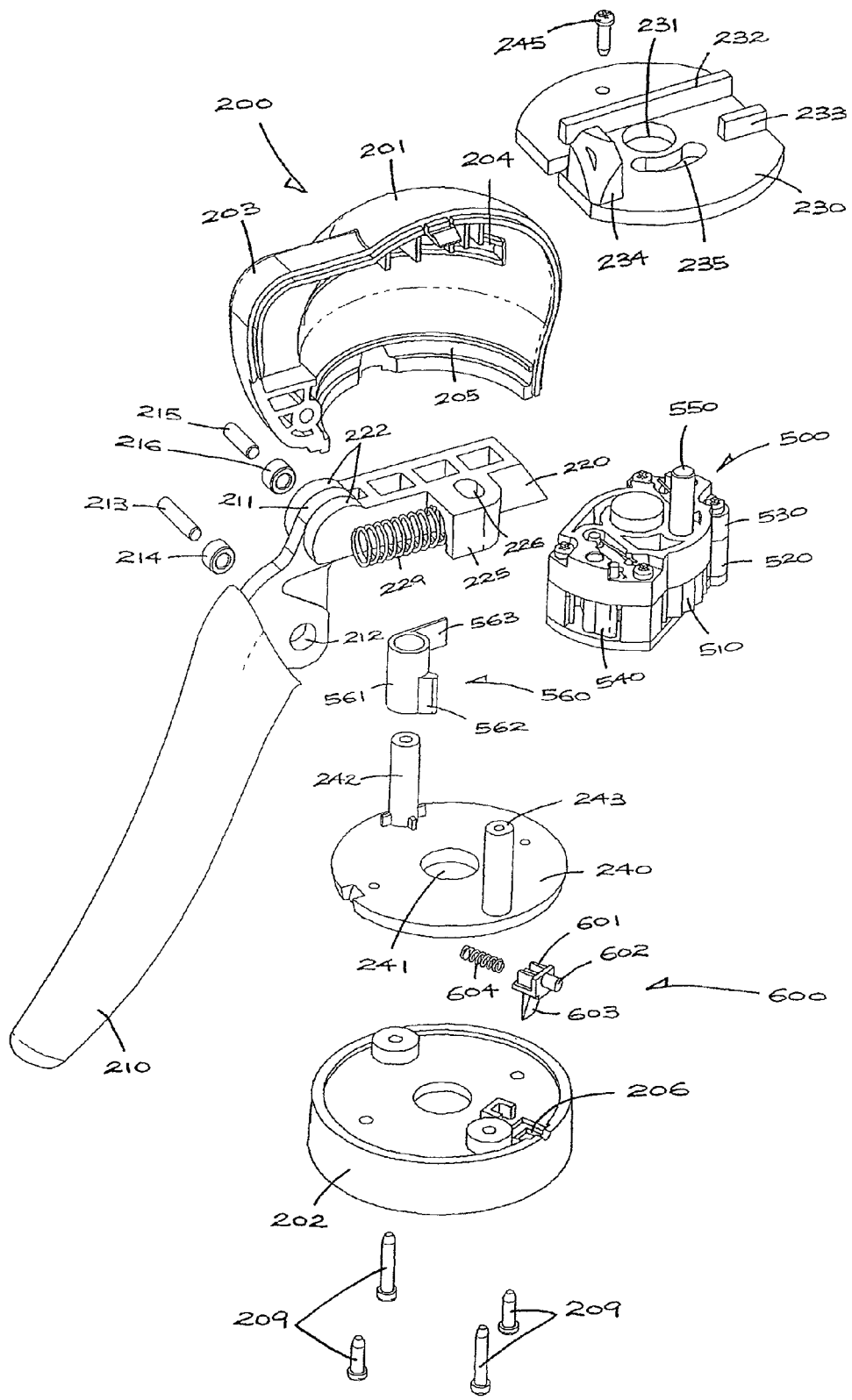
FIG. 3 is an exploded perspective view of the lid of FIG. 2, including a rotary unit.

Referring initially to FIGS. 1 to 6F of the drawings, there is shown a pepper (condiment) grinder 10 embodying the invention, which has an upright plastic body 100 for containing pepper seeds, a lid (closure) 200 closing an open top end 110 of the grinder body 100 through which the grinder body 100 may be refilled with pepper seeds, and a base 400 attached to the grinder body 100 for standing the grinder body 100 on a surface. A grinding mechanism 300 having a metal central operating shaft 310 is provided generally in the base 400, with the shaft 310 extending vertically upwardly through the grinder body 100. Co-axially about a vertical central axis of the grinder body 100, the lid 200 incorporates a drive mechanism for turning the shaft 310 to operate the grinding mechanism 300, whilst the base 400 may be turned to adjust the fineness/coarseness of pepper seeds ground by and dispensed through the grinding mechanism 300.

The aforesaid drive mechanism is implemented by a lever 210 outside the lid 200 and, internally of the lid 200, an oblong slider 220 for movement by the lever 210 and a rotary unit 500 driven by the slider 220 to operate the grinding mechanism 300. The lever 210 is supported for reciprocating pivotal motion relative to the body 100. The slider 220 and rotary unit 500 together constitute a motion translator for translating the lever's reciprocating motion into a uni-directional rotary motion for operating the grinding mechanism 300. The rotary unit 500 is in co-axial engagement with the shaft 310, and the slider 220 is reciprocated by the lever 210 to turn the rotary unit 500 and hence the shaft 310, thereby resulting in operation of the grinding mechanism 300.

The lid 200 has a hollow structure formed by a pair of left and right half shells 201 and a circular base cap 202 that directly closes the grinder body 100. The lever 210 has an inner end 211 situated inside the lid 200, and is connected to an knob 203 on the lid 200 on one side thereof by means of a metal hinge pin 213. While passing through a hole 212 in the lever 210 adjacent the inner end 211, the hinge pin 213 is held captive at its opposite ends in left and right halves of the knob 203. The hole 212 is reinforced by a metal bushing 214 therein surrounding the pin 213.

The rotary unit 500 is located and sandwiched between top and bottom horizontal discs 230 and 240 which are interconnected by means of a pair of left and right posts 242 and 243 on the bottom disc 240. The discs 230 and 240 have respective circular central holes 231 and 241 for locating the rotary unit 500. With a pawl 560 having a tubular axle 561 disposed on the left post 242 and while the rotary unit 500 is also in place, the top disc 230 is attached and then fixed by means of a screw 245 securing through down into the post 242. In this assembly, the pawl 560 is located on the left side of the rotary unit 500.

The top disc 230 has, on its upper surface, two parallel left and right guiding ribs 232 and 233. The left rib 232 extends across nearly the entire width of the disc 230. The right rib 233 is much shorter alongside one end of the left rib 232. A relatively large abutment 234 alongside the other end of the left rib 232 is aligned with the right rib 233 with respect to the left rib 232, such that all three parts together define a linear channel centrally across the top disc 230 for guiding the slider 220 to slide lengthwise along a substantially linear path in opposite directions on the disc 230. An arcuate slot 235 through the top disc 230 is present between the right rib 233 and the abutment 234. The slot 235 has a part-circular longitudinal extent centered at the center of the top disc 230.

The slider 220 has a bifurcate rear end 222 which is pivotably connected to the inner end 211 of the lever 210 by means of a metal hinge pin 215 reinforced by a metal bushing 216. As a result of the hinge connection, the slider 220 is linked with the lever 210 for simultaneous movement such that the lever 210 upon pivoting slides the slider 220 back and forth substantially linearly. The slider 220 includes a side protrusion 225 integrally on its right side, which has a short slot 226 extending transversely of the slider 220.

A coil spring 229 is compressed between the side protrusion 225 and the abutment 234 to resiliently bias the slider 220 forward, such that normally the slider 220 stays in a foremost position (FIGS. 5A and 6A) with the lever 210 inclined away from the side of the grinder body 100. As the lever 210 is pressed to pivot towards and eventually reaching the grinder body 100, it withdraws the slider 220 backwards against the action of the spring 229 into a rearmost position (FIGS. 5B and 6D) Upon release of the lever 210, the spring 229 immediately returns the slider 220 to its foremost position and the lever 210 off the grinder body 100. The pivoting angle of the lever 210 is about 30 degrees.

Figure 4:
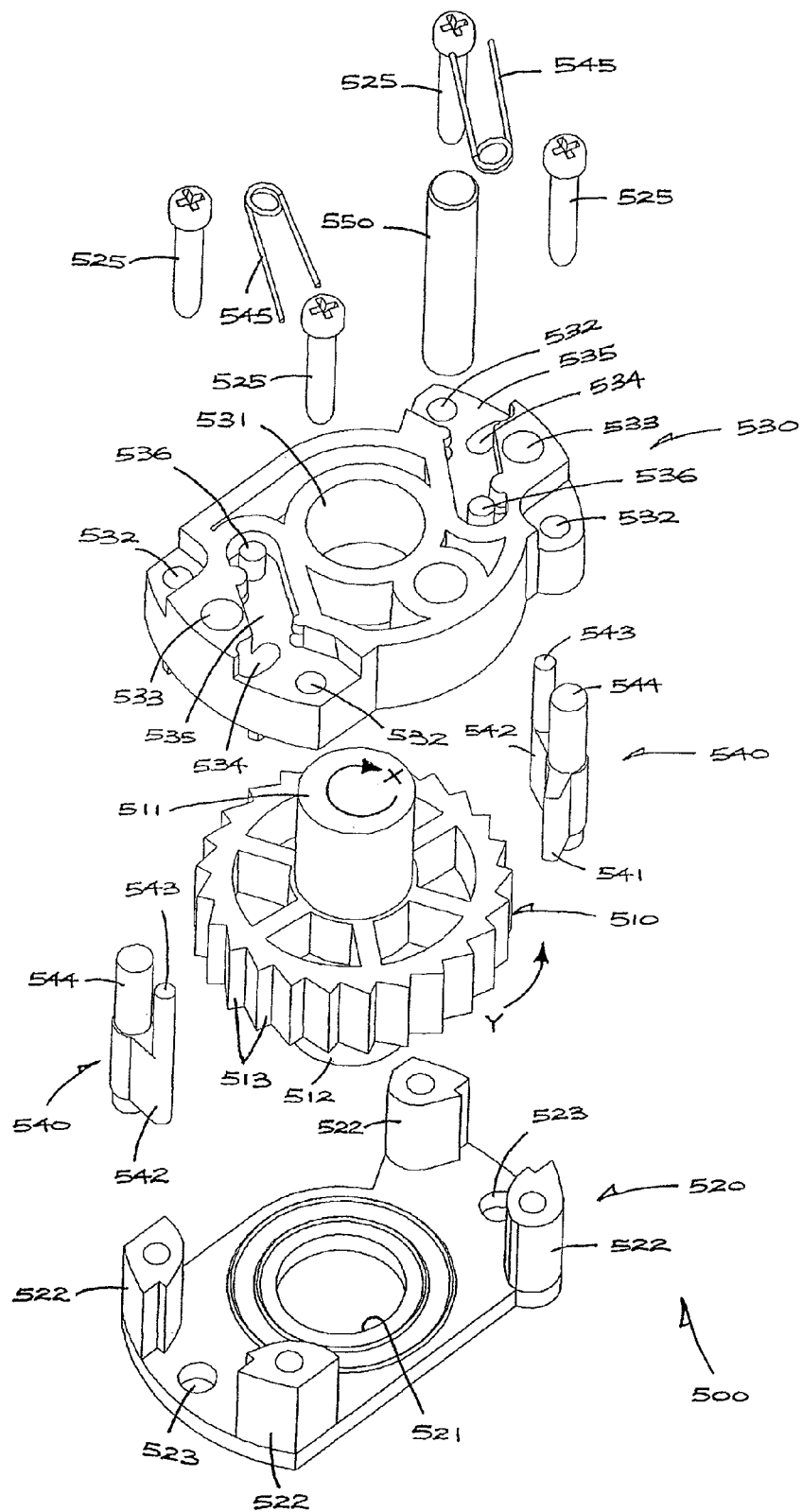
FIG. 4 is an exploded perspective view of the rotary unit of FIG. 3.
Figure 5A:
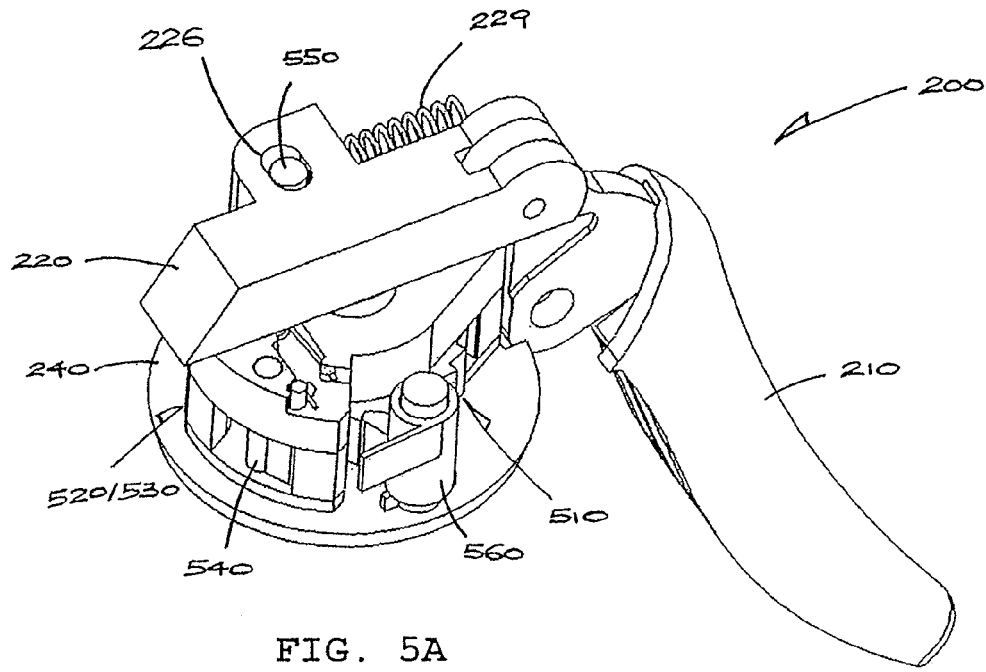
FIGS. 5A and 5B are perspective views of major components of the lid of FIG. 3, in an assembled condition.
Figure 5B:
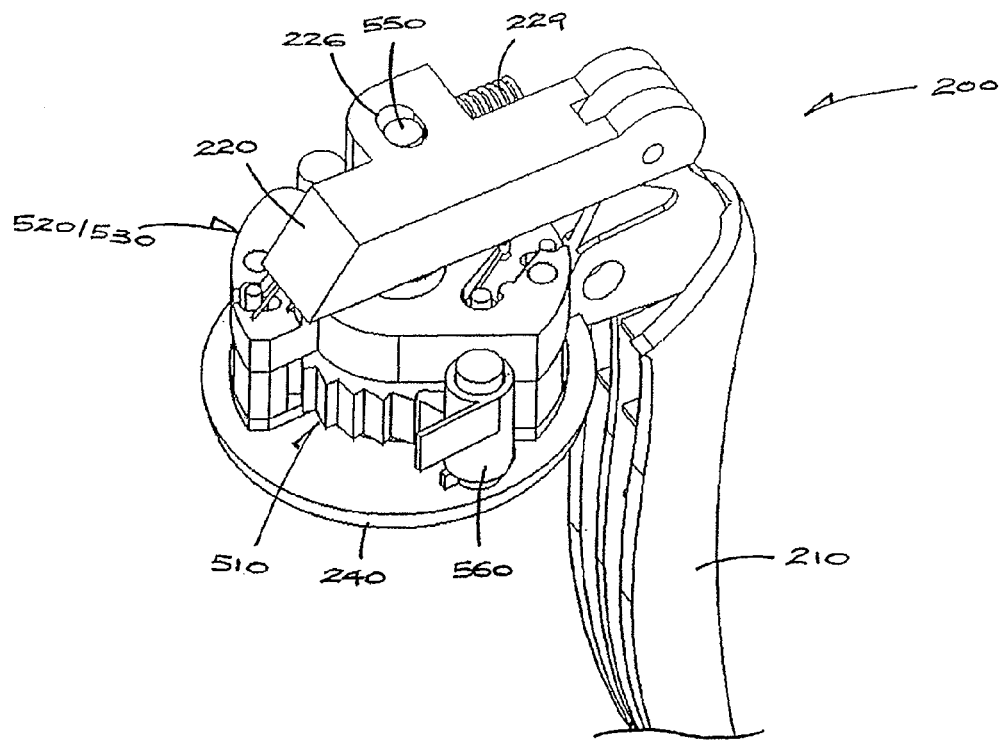

Referring to the rotary unit 500, it is a generally rectangular sandwiched structure formed by a toothed wheel 510 (having 24 teeth) lying horizontally on a lower plate 520 and covered by an upper plate 530. The wheel 510 has an upper shaft 511 and a lower shaft 512 centrally and vertically aligned, and includes a ring of triangular teeth skewed in an anti-clockwise direction Y (FIG. 4). The lower plate 520 has a circular central hole 521, four short posts 522 at its corners, and a pair of small holes 523 at its shorter sides. With its lower shaft 512 fitting through the central hole 521 of the lower plate 520, the wheel 510 sits on the lower plate 520.

The upper plate 530 has a circular central hole 531, four small holes 532 at its corners, and two small holes 533 ad 534 at each of its shorter sides. With its central hole 531 fitting around the upper shaft 511 of the wheel 510, the upper plate 530 covers the wheel 510 and is secured by four screws 525 through its corner holes 532 with the posts 522 of the lower plate 520. The two plates 520 and 530 with the four posts 522 form a cage 520/530 that encloses the wheel 510, together forming a unitary structure.

The wheel 510 may turn relative to the cage 520/530, and vice versa, about the same axis of the wheel's upper and lower shafts 511 and 512 which protrude beyond the upper and lower plates 530 and 520 respectively. The lower shaft 512 has a central square hole (despite not being shown) which is exposed and accessible from below.

The rotary unit 500 includes, at its opposite ends (i.e. shorter sides), a pair of pawls 540 which are also installed between the two plates 520 and 530 and at the same time as the wheel 510.

Each of the pawls 540 has a horizontal front and rear end 541 and 542 pointing in opposite directions and a vertical axle 544 between the two ends 541 and 542, with the rear end 542 bearing an upwardly projecting pin 543.

Each pawl 540 is located between the two plates 520 and 530 at a respective shorter side thereof adjacent the wheel 510, with its axle 544 journalled through the holes 523 and 533 and its pin 543 projecting out of the upper plate 530 through the latter's hole 534. Overall, the pawls 540 are supported for limited pivotal movement about their axles 544 on opposite sides of the wheel 510, close to its teeth 513.

For each pawl 540, an elbow spring 545 located in a recess 535 on the upper plate 530 about a peg 536 therein acts upon the projecting pin 543 and hence the rear end 542, thereby pivoting the pawl 540 such that its front end 541 bears resiliently against the teeth 513 of the wheel 510. The teeth 513 are inclined towards and the front end 541 points at each other such that they together constitute a ratchet.

There are two such ratchets, one by each pawl 540, which allow relative angular movement between the wheel 510 and the cage 520/530 in only one direction. More specifically, as in actual operation, through the action of the ratchets, the cage 520/530 holds and turns the wheel 510 in the clockwise direction X, and releases and skips the wheel 510 when it reverses in the anti-clockwise Y. In short, the cage 520/530 can only angularly drive the wheel 510 in one direction.

The two pawls 540, acting on opposite sides of the wheel 510, hold and turn the wheel 510 in a balanced manner for a firm inter-engagement to transmit a sufficiently large driving force.

The rotary unit 500 is sandwiched between the top and bottom discs 230 and 240, with the upper and lower shafts 511 and 512 of the wheel 510 from inside the cage 520/530 fitting in the central holes 231 and 241 of the discs 230 and 240 respectively.

The rotary unit 500 includes a vertical pin 550 on the cage 520/530, upstanding from the upper plate 530, at an off-centre position along the right longer side of the rotary unit 500. The pin 550 projects upwardly through and beyond the slot 235 of the top disc 230. The slot 235 is sufficiently long to cater for the angular movement of the cage 520/530. The pin 550 has its upper end inserted into and in a sliding engagement with the slot 226 of the side protrusion 225 of the slider 220, such that the cage 520/530 is linked with the slider 220 for angular movement thereby.

In the drive transmission from the lever 210 and slider 220 to the wheel 510, the cage 520/530 acts as an intermediate member between the slider 220 and the wheel 510, the intermediate member being rotatable to transmit drive from the slider 220 to the wheel 510.

The assembly, being formed by the two discs 230 and 240, the rotary unit 500 sandwiched between them and the slider 220 fitted on the upper disc 230, is inserted laterally into one of the two shells 201, while the lever 210 hinged to the slider 220 stays outside. That shell 201, as well as the other shell 201, has a pair of upper and lower horizontal grooves 204 and 205 for locating the discs 230 and 240 respectively. The pin 213 is then inserted to hinge the lever 210 to the shell 201. The other shell 201 is subsequently fitted upon the first shell 201 and fixed thereto by glue. The base cap 202 is finally fitted upon the two shells 201 from below and secured to the bottom disc 240 by four screws 209. This completes the construction of the lid 200.

The pawl 560 is located on the left side of the rotary unit 500 as mentioned above, adjacent the wheel 510 and close to its teeth 513. The pawl 560 includes a front end 562 and a resilient rear tab 563 extending from the axle 561 at about 90 degrees apart. While assembled inside the shells 201, the rear tab 563 is pressed against the inner surface of the left shell 201, whereby the front end 562 bears resiliently against the teeth 513 of the wheel 510. The front end 562 points at and the teeth 513 are inclined towards each other, together constituting a third ratchet which stops the wheel 510 turning in the opposite, anti-clockwise direction Y, after the wheel 510 has been turned by the cage 520/530 in the clockwise direction X.

As the lid 200 closes the open top end 110 of the grinder body 100, the lower shaft 512 of the wheel 510 co-axially engages upon and receives, into its square hole, the uppermost end of the operating shaft 310 of the grinding mechanism 300. The shaft 310 has a complementary square cross-section as the said hole such that it is in angular engagement with the wheel 510, for simultaneous turning by the wheel 510.

The lid 200 is attached to the open top end 110 of the grinder body 100 through four bayonet joints. To deadlock the joints, a lock 600 is employed between the grinder body 100 and the lid 200, whereby the lid 200 is secured.

The lock 600 is mounted on the base cap 202 inside the lid 200, where there is a hole 206 that permits access of the lock 600 to the rim of the body end 110. The rim has a keeper recess on its inner surface. The lock 600 has a body 601 and a button 602 and tongue 603 on the front of and depending from the body 601. The lock's body 601 is located in a seat formed right behind the edge of the base cap 202 and over the hole 206, with the tongue 603 projecting downwardly through the hole 206 for engaging the recess when the two parts are aligned by the bayonet joints. A coil spring 604 pushing from behind the lock's body 601 keeps the tongue 603 in the recess and urges the button 602 outward for pressing to disengage the tongue 603 from the recess, whereupon the lid 200 may be turned to release the joints.

Figure 6A:
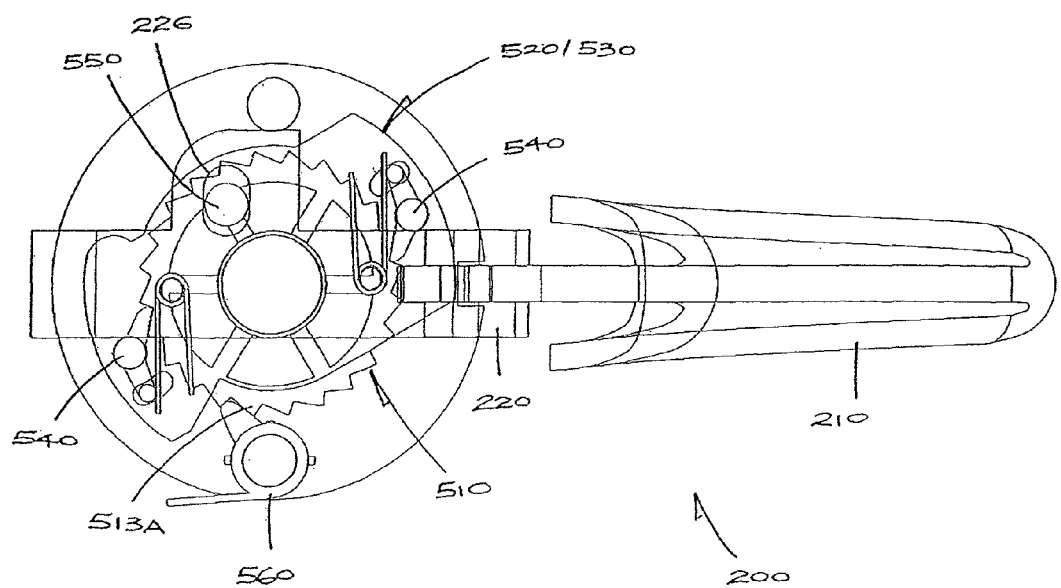
FIGS. 6A to 6F are top plan views of the lid components of FIGS. 5A and 5B, showing their operation in sequence.
Figure 6B:
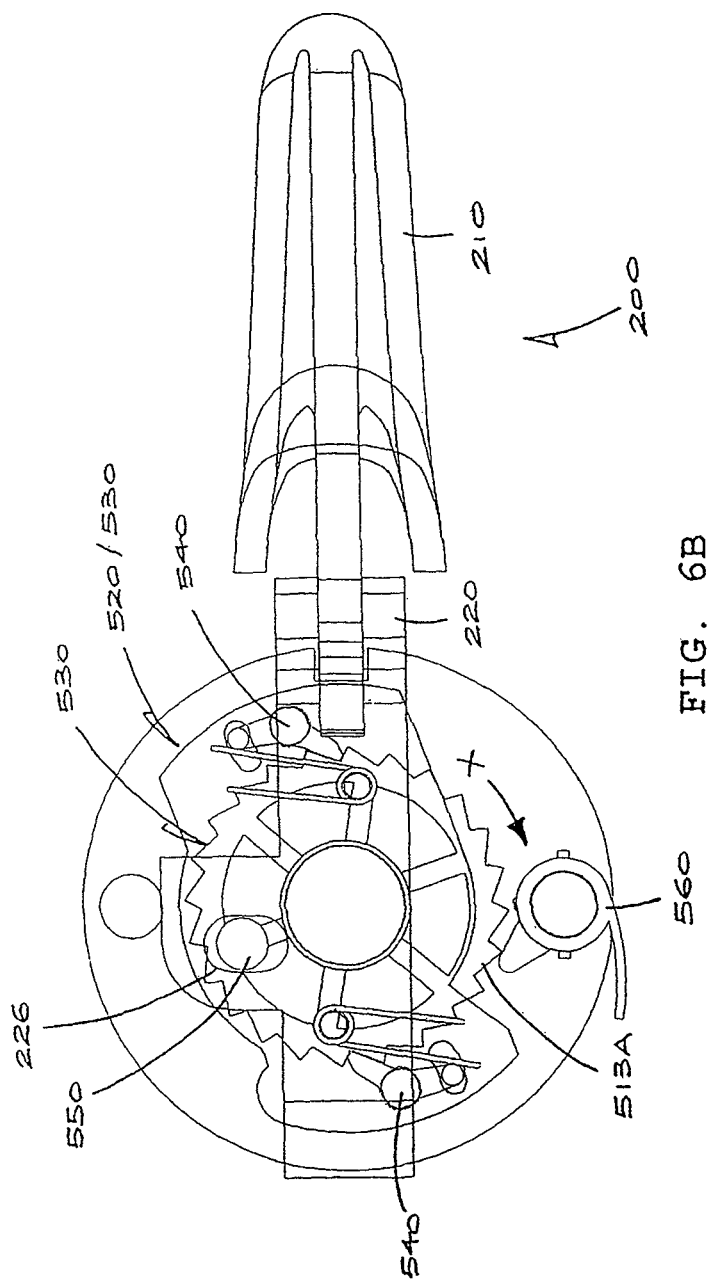
Figure 6C:
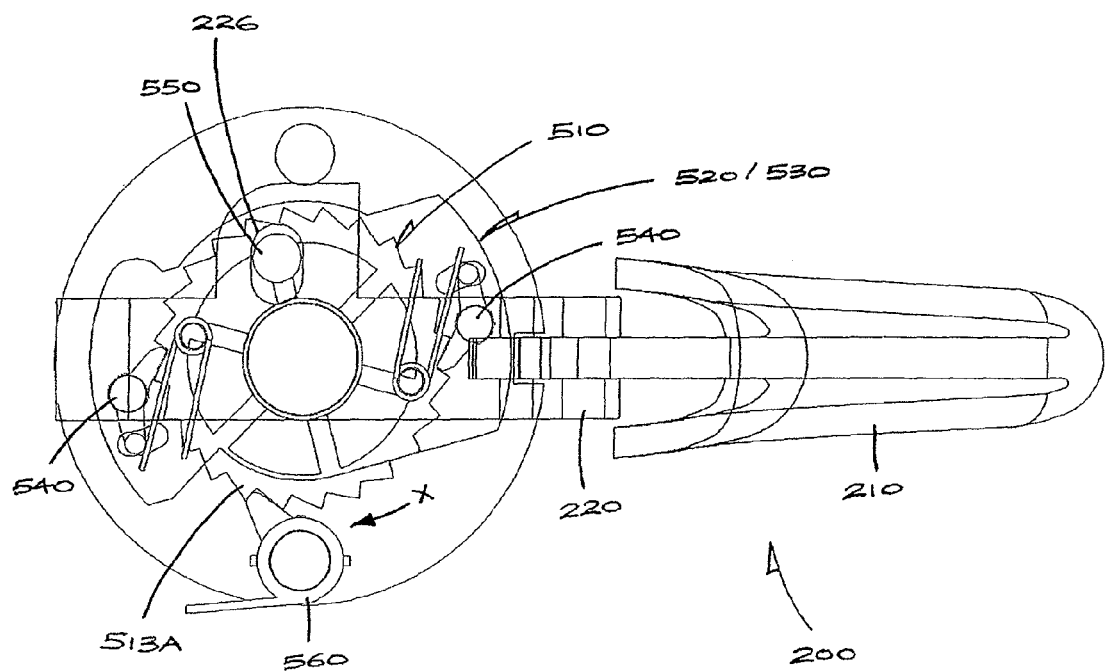

The operation of the drive mechanism is best illustrated in FIGS. 6A to 6F. The lever 210, as part of the drive mechanism, is connected for reciprocating pivotal motion to, via the aforesaid motion translator, turn the shaft 310 for operating the grinding mechanism 300 to grind pepper. The motion translator translates the lever's reciprocating motion into a unidirectional stepwise rotary motion for the shaft 310. The lever 210 is pivotable towards and away from the grinder body 100, and it stays in a normal position farthest from the body 100 under the resilient action of the spring 220 that biases the slider 220 to slide forward (FIG. 6A).

Upon being pressed towards the grinder body 100, the lever 210 pulls the slider 220 rearward. Through the sliding engagement between its side slot 226 and the pin 550 of the cage 520/530, the slider 220 turns the cage 520/530 in the clockwise direction X, with the cage 520/530 in turn simultaneously rotating the wheel 510 in the same direction and hence the shaft 310 for operating the grinding mechanism 300.

The cage 520/530 turns the wheel 510 through a holding ratchet action between the former's pawls 540 and the latter's teeth 513. As the wheel 510 turns clockwise, its tooth 513A adjacent the third pawl 560 rides over and skips the pawl 560 (FIG. 6B), through a releasing ratchet action, until it completely escapes the pawl 560 (FIG. 6C), whereupon the wheel 510 has been turned by one tooth 513. A double ratchet action in opposite senses, i.e. holding and releasing, is performed.

Figure 6D:
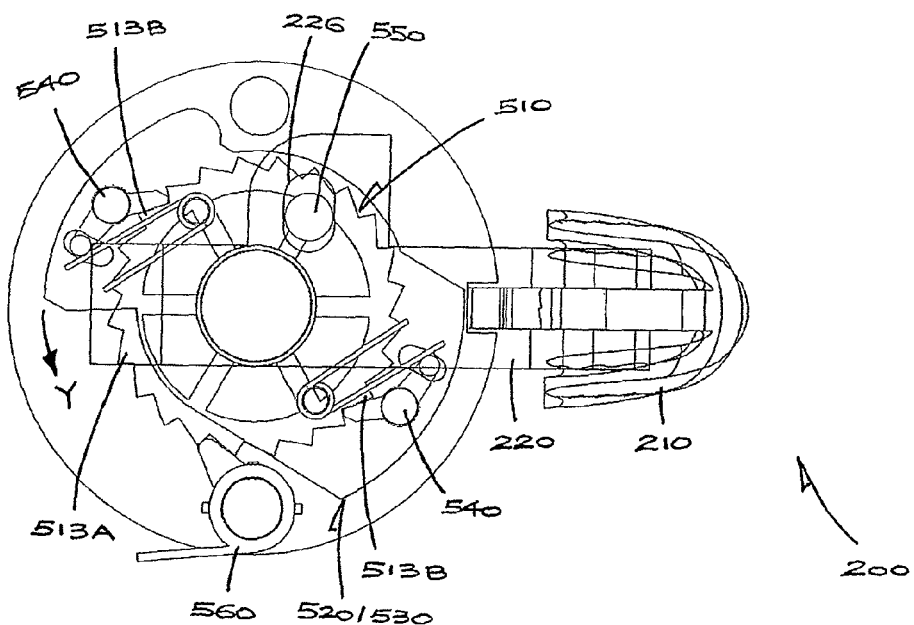
Figure 6E:
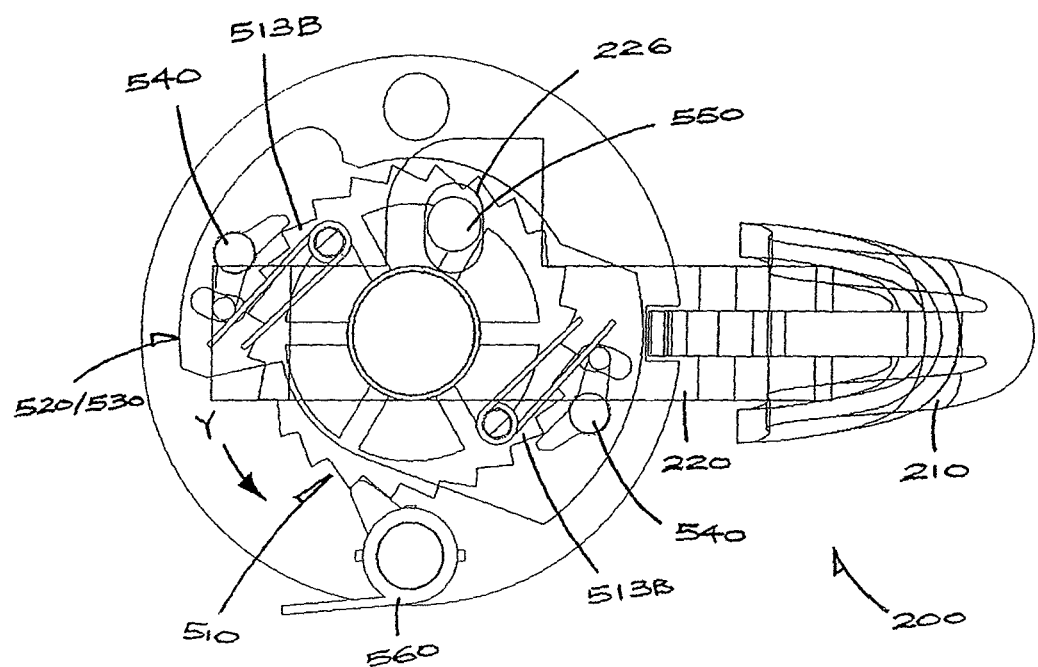
Figure 6F:
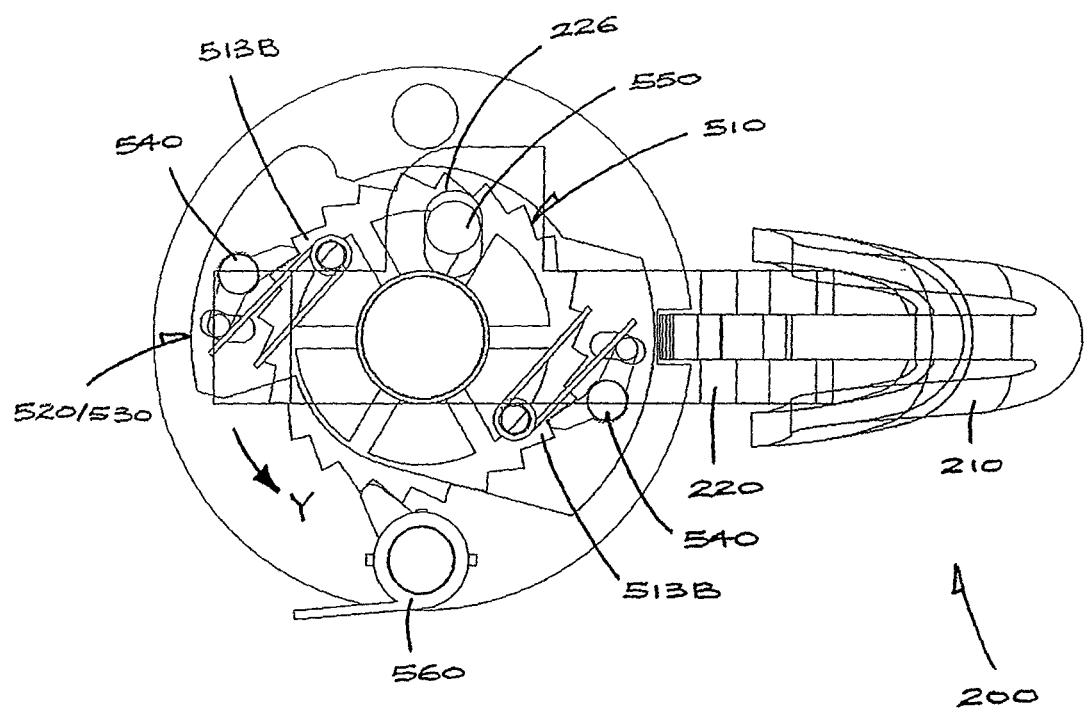
Figure 7:
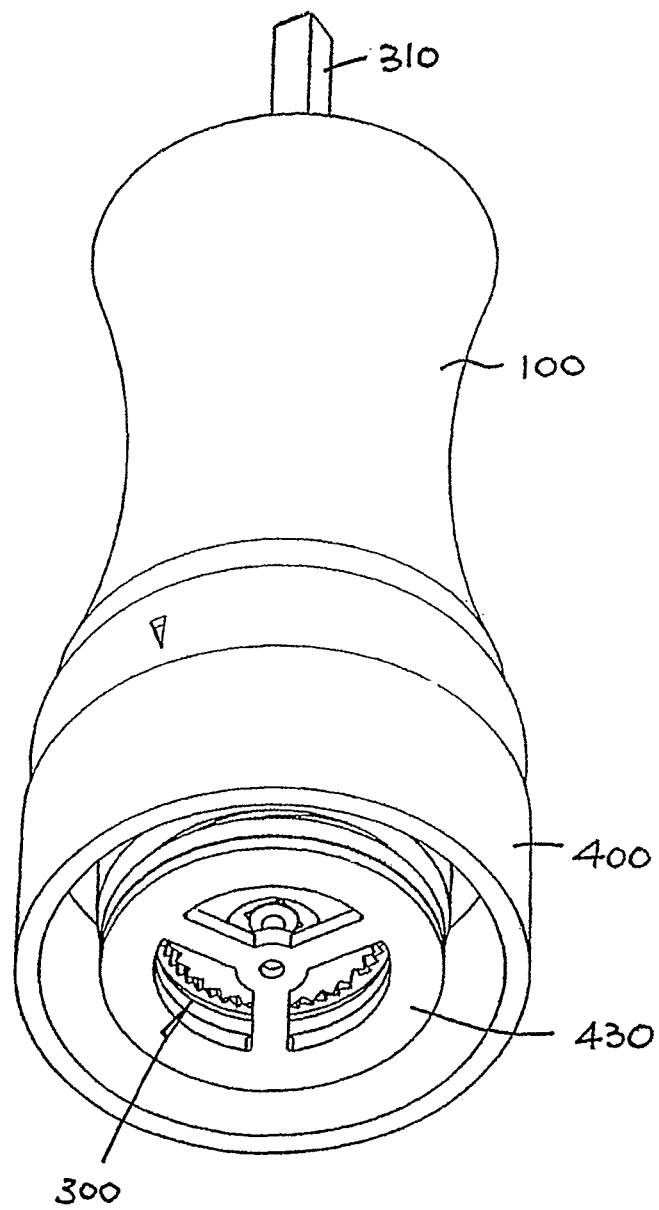
FIG. 7 is a bottom perspective view of the grinder body and base of FIG. 2.
Figure 8:
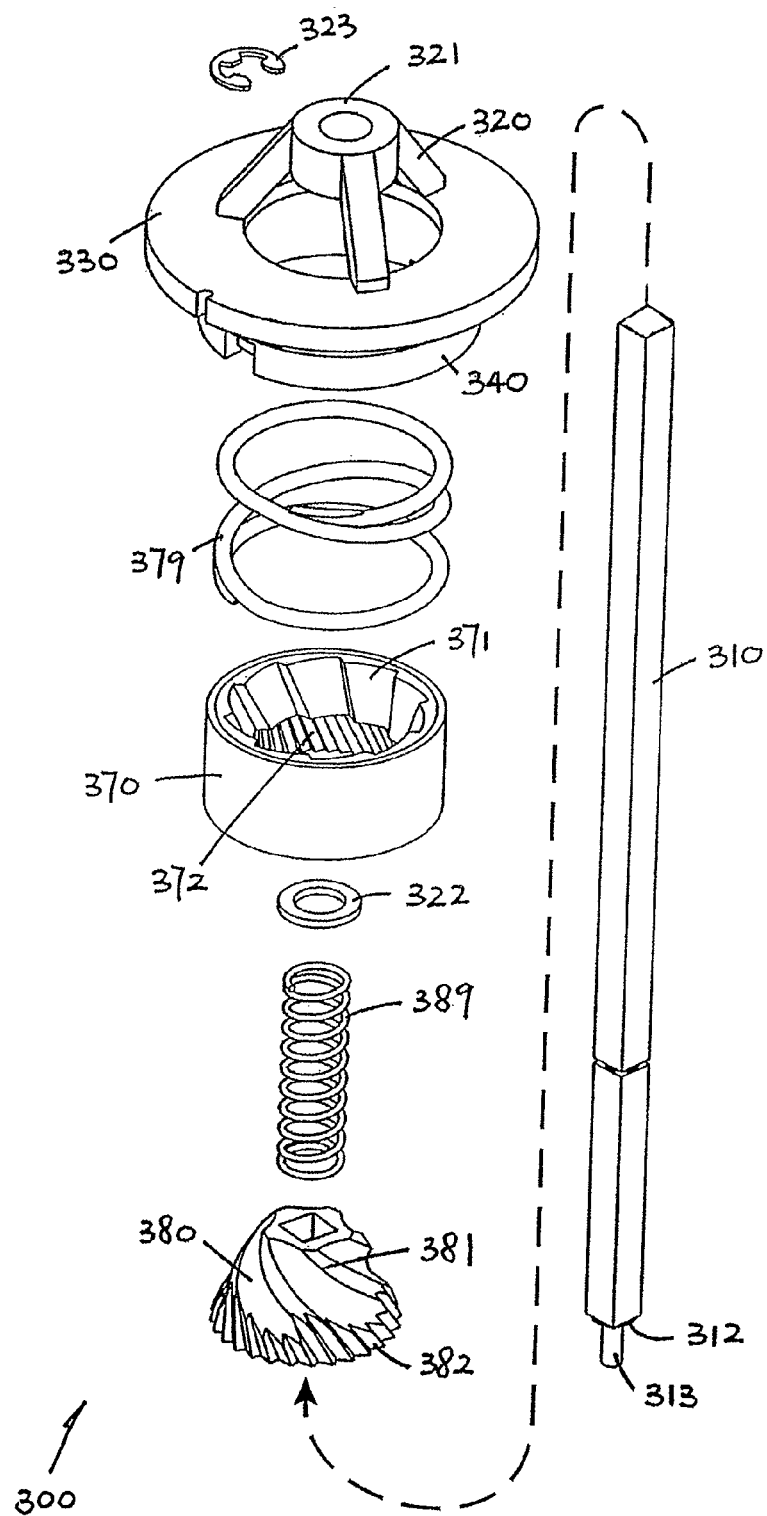
FIG. 8 is an exposed top perspective view of a grinding mechanism of the grinder of FIG. 1.

At the moment when the lever 210 hits the grinder body 100, or gets closest possible thereto, it stops and the wheel 510 has been turned by four teeth 513, or an angle of 60° i.e. one sixth of a complete turn (FIG. 6D). During this first stage of operation, the cage 520/530 remains in angular engagement clockwise with the wheel 510 through the holding ratchet action between the former's pawls 540 and the latter's teeth 513.

Upon release, under the action of the spring 220 that biases the slider 220 forward, the lever 210 starts to pivot back away from the grinder body 100 as the slider 220 starts to slide forwards, thereby reversing the cage 520/530 in the anti-clockwise direction Y (FIG. 6D). With the wheel 510 now being stopped by the pawl 560 in the revered direction through a holding ratchet action, the two pawls 540 of the cage 520/530 ride over and skip the respective adjacent teeth 513B of the wheel 510 (FIG. 6E), through a releasing ratchet action, until they completely escape the respective teeth 513B (FIG. 6F), whereupon the cage 520/530 has been turned by one tooth 513. A double ratchet action in opposite senses likewise takes place, though the holding and releasing roles are swapped between the mobile pawls 540 and the stationary third pawl 560.

At the moment when the slider 220 reaches its original foremost position, the lever 210 returns to its normal position and the cage 520/530 has been turned by four i.e. the same number of teeth 513 back to its original position (back to FIG. 6A). During this second stage of operation, the wheel 510 remains in angular engagement anti-clockwise with the third pawl 560 through the holding ratchet action between its teeth 513 and the pawl 560.

After the wheel 510 has been advanced clockwise by four teeth 513, and as the cage 520/530 has been reset in terms of its position, the lever 210 can then be pressed and released as described above to repeat the two stages of operation until the desired quantity of pepper has been ground and dispensed.

The lever 210 is in its normal position inclined farthest from the grinder body 100, but only to a limited distance or angle of about 20 degree from vertical such that one-hand operation is possible. Thus, only one hand is needed for operation by, for example, holding the grinder body 100 in one hand with the index and middle fingers stretching out to pivot the lever 210 inwards, as easy and convenient like pulling a trigger.

Reference is now made to FIGS. 7 to 18A for the remaining parts and components of the pepper grinder 10.

For the grinding mechanism 300, its square-sectioned operating shaft 310 extends upwardly from within the base 400 through the grinder body 100 for engagement with the lid 200. The mechanism 300 includes a tripod-like plastic mount 320 that supports the shaft 310 for rotation and further includes a pair of porcelain female and male grinders 370 and 380, through the three of which the shaft 310 passes.

The female grinder 370 has a cylindrical body whose inner surface has frusto-conically shaped upper and lower parts converging towards each other, on which respective slightly skewed teeth 371 and 372 are formed. The male grinder 380 has a generally frusto-conical body which includes a square central through hole engaging the shaft 310 for rotation thereby and whose outer surface has upper and lower parts formed with respective skewed teeth 381 and 382. The male grinder 380 remains generally within the female grinder 370, being spaced apart by an annular gap and in particular a frusto-conical gap between their lower teeth 382 and 372 in which pepper seeds are to be ground.

The upper teeth 371 and 381 are relatively coarse and co-operate to draw in and crush pepper seeds, whereas the lower teeth 372 and 382 are relatively fine and co-operate to subsequently grind the crushed seeds into much smaller pieces for serving.

Figure 10:
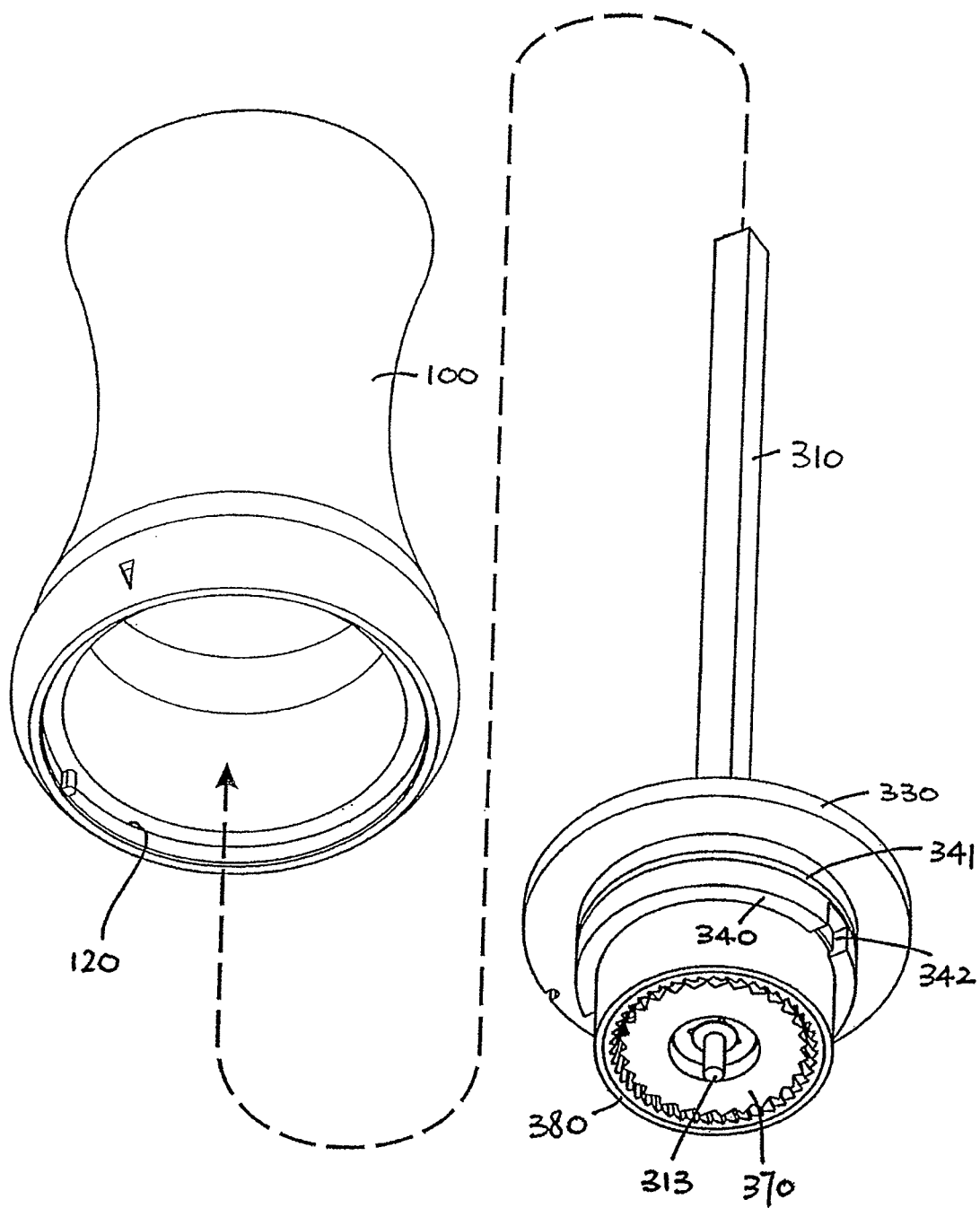
FIG. 10 is a bottom perspective view showing how the grinding mechanism of FIG. 9 is fitted to the grinder body.
Figures 11, 11A:
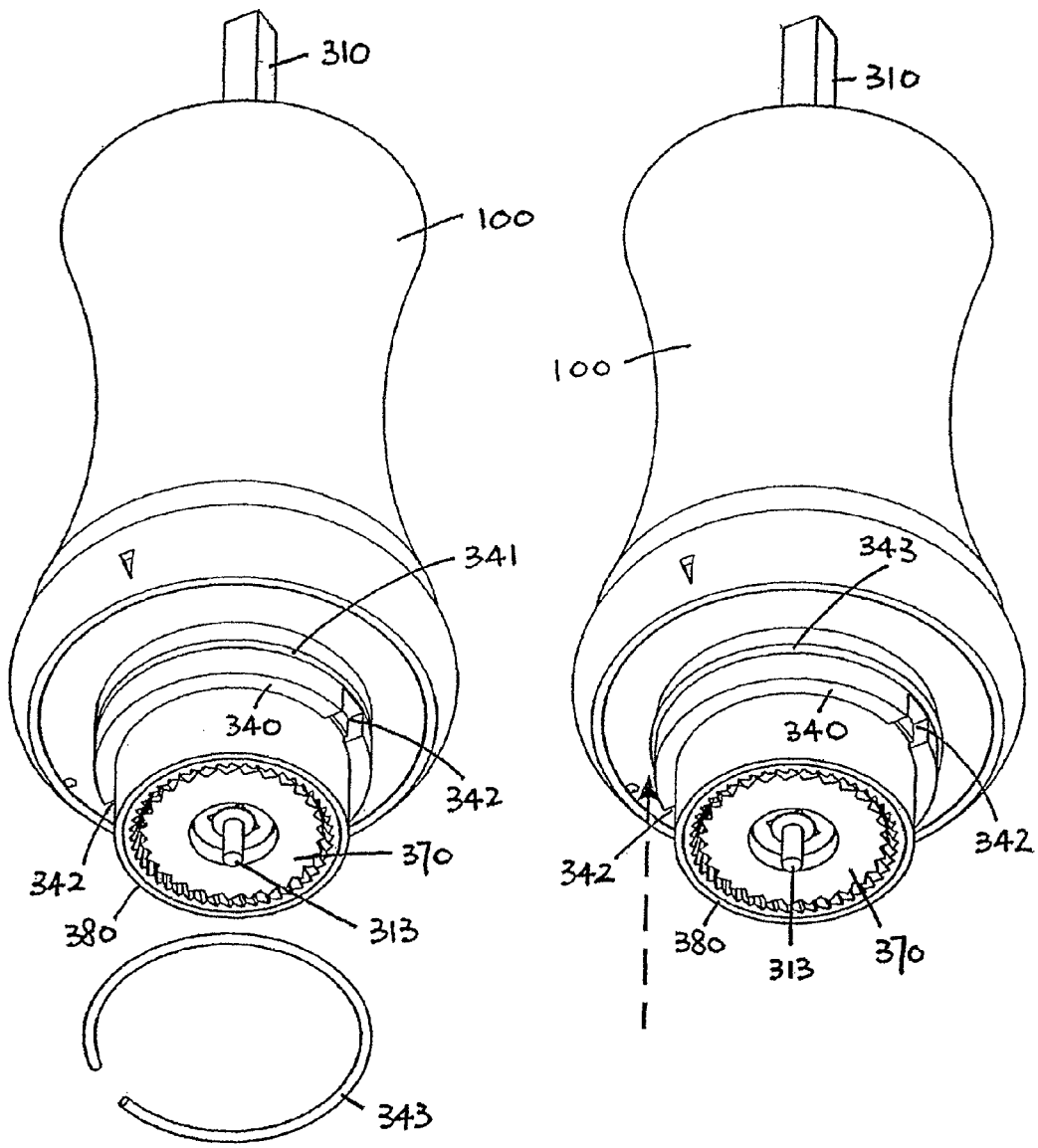
FIGS. 11 and 11A are bottom perspective views of the assembly of FIG. 10, showing how a connection ring is fitted thereon.

The mount 320 has a circular peripheral flange 330 that is attached and sealed (for example by glue or ultrasonic welding) to extend across an open bottom end 120 of the grinder body 100 (FIG. 10). The mount 320 includes a depending cylindrical collar 340 that receives the female grinder 370 by its an upper end as a sliding fit and supports it for limited upward/downward movement. The collar 340 has in its outer surface a pair of diametrically opposite rectangular recesses 342.

The female grinder 370 is resiliently biased downwards by a thick co-axial coil spring 379 compressed inside the collar

Figure 9:
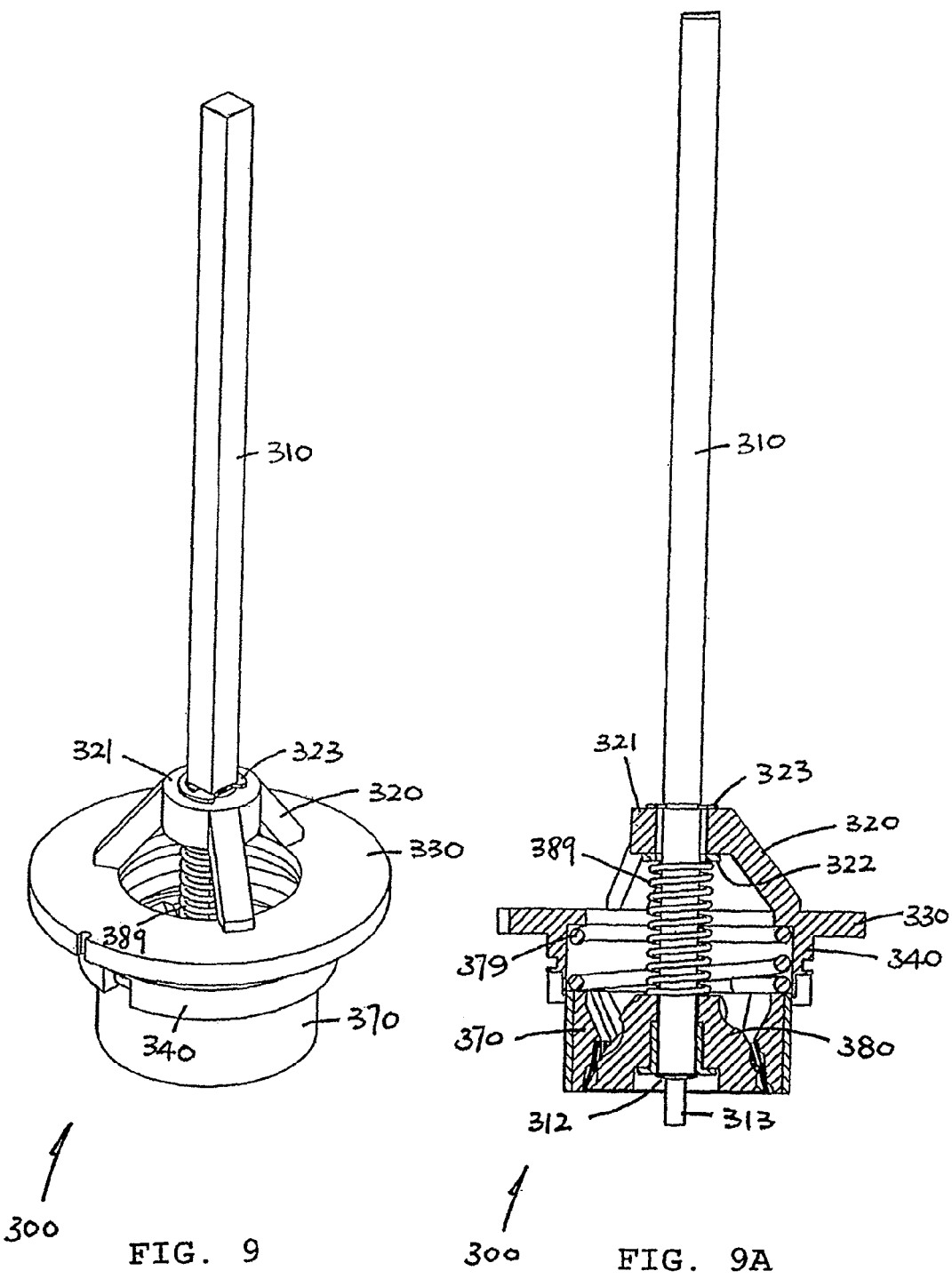

340. The male grinder 380 is inserted from below into the female grinder 370, keeping it with the collar 340. A thin co-axial compression coil spring 389 on the shaft 310 resiliently biases the male grinder 380 downwards. Whilst the male grinder 380 is retained on the shaft 310 by a slightly expanded bottom end 312 thereof, the associated spring 389 acts via a washer 322 upwardly upon an apex 321 of the mount 320 that surrounds the shaft 310. A circlip 323 is fitted on the shaft 310 right above the apex 321 so as to retain the mount 320 and hence the grinders 370 and 380 at the lower end of the shaft 310, whereby the grinding mechanism 300 is assembled as a module (FIGS. 9 and 9A).

The base 400 is formed by a cylindrical outer ring 410 and a smaller cylindrical inner ring 420 assembled in the outer ring 410. The outer base ring 410 has outer and inner cylindrical double walls 411 and 412 that are integrally connected across their top ends by an annular flat wall 413. The inner wall 412 includes, on its inner surface, a pair of opposed symmetrical screw thread sections 416 each having a series of four shallow recesses 417 evenly spaced along its upper side.

The inner base ring 420 has a cylindrical wall 421, which fits slidably co-axially within the inner wall 412 of the outer base ring 410 and around the bottom of which a peripheral flange 422 extends. The flange 422 protrudes on opposite outer and inner sides of the wall 421. The wall 421 includes a pair of opposed symmetrical screw thread sections 426 on its outer surface, and a pair of rectangular tabs 427 that projects upwardly and is radially offset slightly outwards.

The inner base ring 420 is screwed into the outer base ring 410 from below through engagement between their screw thread sections 426 and 416, with the result that the inner base ring 420 will be lifted or lowered through a cam action as the outer base ring 410 is turned relative thereto in either direction by a person.

The base 400 has a diameter similar to that of the bottom end 120 of the grinder body 100. The base 400 is connected to the bottom body end 120 such that the inner wall 412 of its outer base ring 410 is disposed about the mount collar 340 and the top wall 413 thereof is in contact with the mount flange 330. At the same time, the inner base ring 420 surrounds the female grinder 370 protruding downwardly from the collar 340, with its wall 421 and the inner side of its bottom flange 422 together acting as a sliding fit seat supporting the female grinder 370 against the action of the spring 379.

The mount flange 330 has a depending peg 331 that slidably engages an arcuate groove 415 extending over an angle of about 90° in the top wall 413 of the outer base ring 410. The inner base ring 420 meets the collar 340 from below, with its tabs 427 slidably retained by the collar recesses 342 such that the inner base ring 420 is held against turning and can only slide upwards and downwards as caused by the outer base ring 410 upon turning.

Figures 12, 12A:
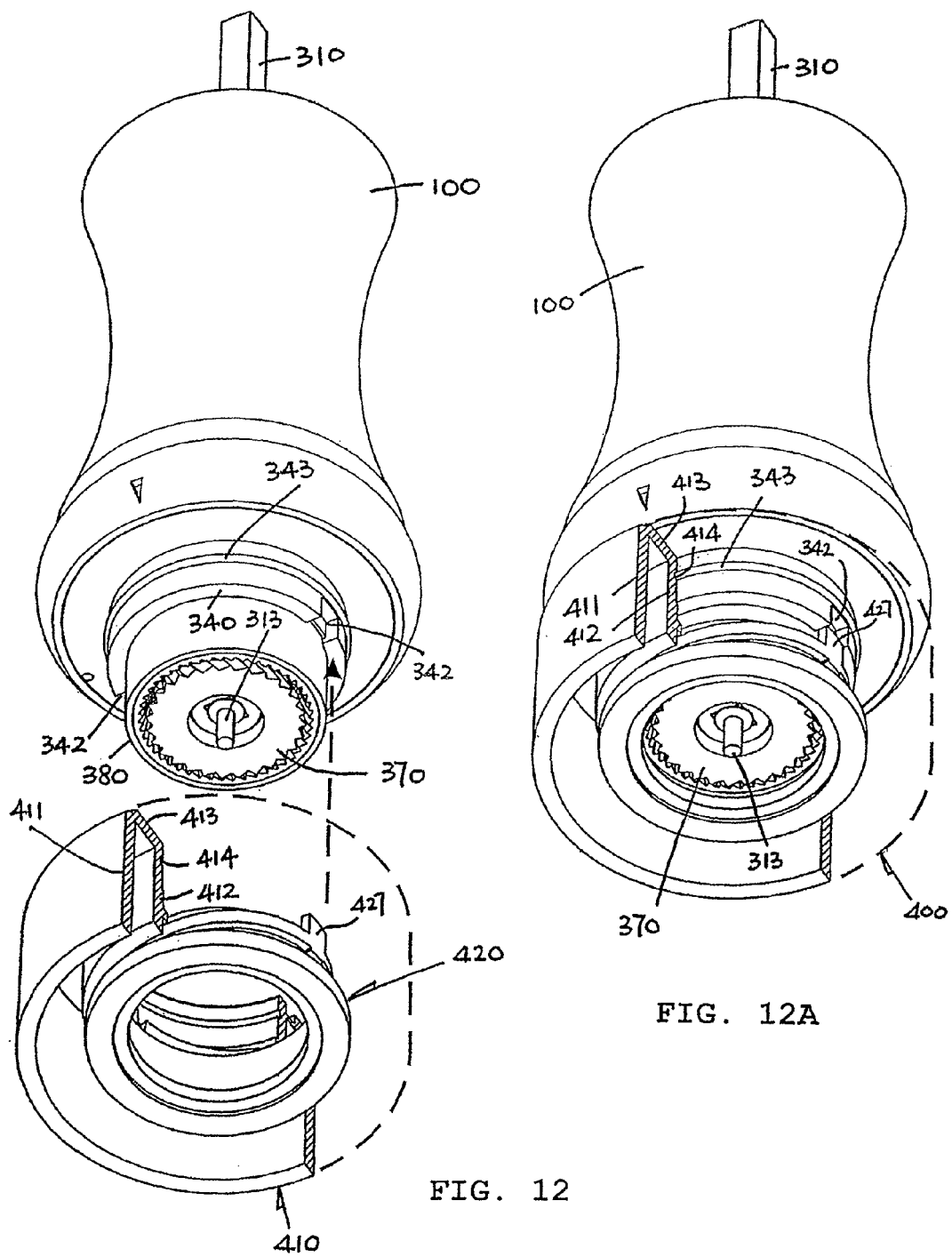
FIGS. 12 and 12A are bottom perspective views of the assembly of FIG. 11A, showing how a base is fitted thereto.
Figure 13:
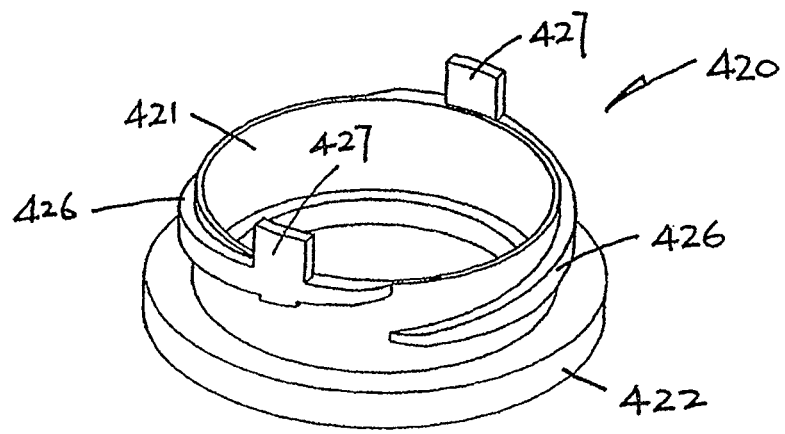
FIG. 13 is a top perspective view of an inner ring of the base of FIG. 12.
Figure 15:
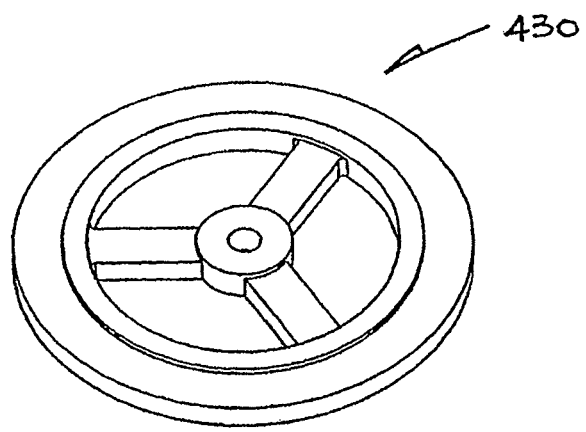
FIG. 15 is a top perspective view of a bottom bearing used in the base of FIG. 12.
Figure 14:
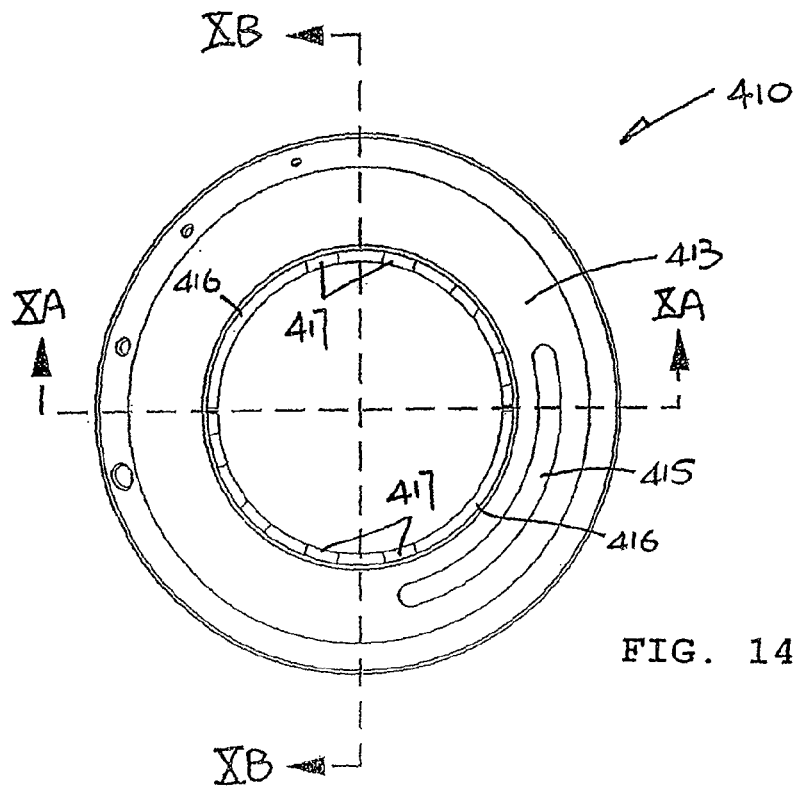
FIG. 14 is a top plan view of an outer ring of the base of FIG. 12.
Figure 14A:
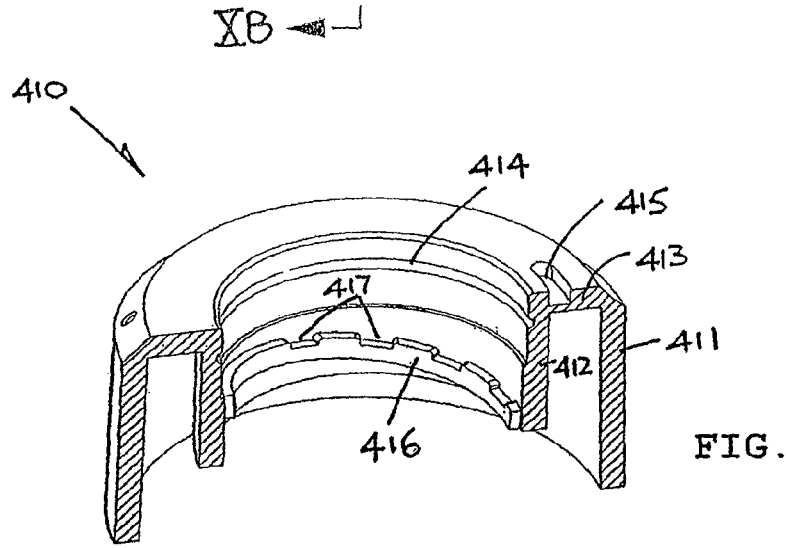
FIGS. 14A and 14B are cross-sectional views of the outer base ring of FIG. 14, taken along lines XA-XA and XB-XB respectively.
Figure 14B:
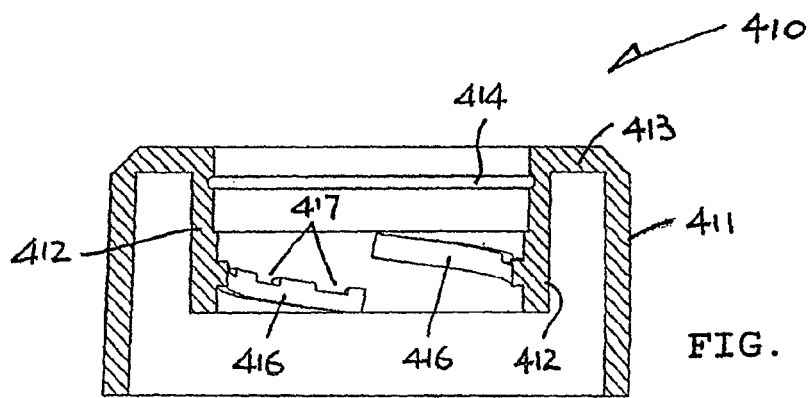

Connection of the base 400 to the grinder body 100 via the mount 320 is secured by a split spring wire ring 343 which inter-engages a pair of aligned annular grooves 341 and 414 in the confronting surfaces between the mount collar 340 and the outer base ring inner wall 413. The spring ring 343 is first located partially in the collar groove 341 (FIGS. 11 and 11A), and the outer base ring 410 is then push-fitted about the collar 340 such that its inner wall groove 414 engages over the spring ring 343 on the collar 340 (FIGS. 12 and 12A). The collar groove 341 is just sufficiently deep to allow room for the spring ring 343 to be pressed in before the other groove 414 comes and snaps into place.

With this connection the outer base ring 410 is rotatable of turnable relative to the grinder body 100 and hence the inner base ring 420, though the angle of rotation is limited to about 90° by reason of the sliding engagement between the peg 331 and the groove 415. The outer base ring 410 will, upon turning, lift or lower the inner base ring 420 that in turn displaces the female grinder 370 upwards or downwards relative to the male grinder 380.

Thus, turning of the base 400 by its outer ring 410 relative to the grinder body 100 will alter the axial position of the inner base ring 420 and in turn that of the female grinder 370 relative to the male grinder 380. This will result in a change in the gap width between the lower teeth 372 and 382 of the two grinders 370 and 380, thereby adjusting the pepper grinding size.

Under the action of the spring 379 via the female grinder 370, the inner base ring 420 is resiliently pressed downwardly against the outer base ring 410 by their screw threads 426 and 416. Whilst each of the lower screw threads 416 has a said series of recesses 417, the engaging upper screw thread 426 includes the lower end of its associated tab 427 as a protrusion (FIG. 13) that is engageable with one of the recesses 417 depending on the angular position of the outer base ring 410 to define that position. As the recesses 417 are shallow and their upper corners are round, they can easily click past the lower ends of the tabs 427 upon turning of the outer base ring 410.

Figure 16:
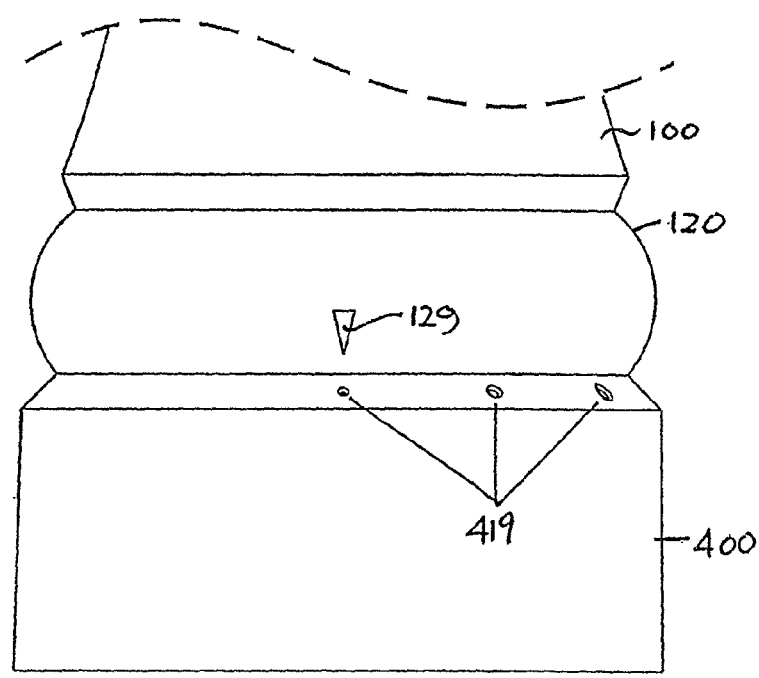
FIGS. 16 and 16A are an elevational side view and a cross-sectional side view of the bottom of the grinder of FIG. 1, with the base turned for coarse grinding.
Figure 16A:
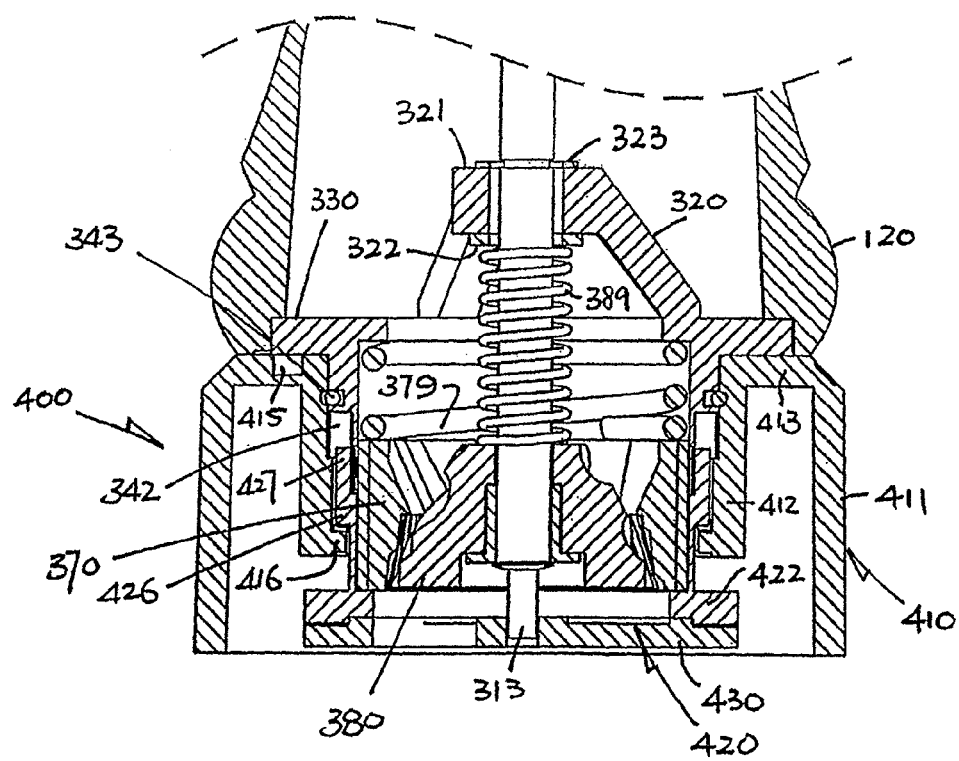
Figure 17:
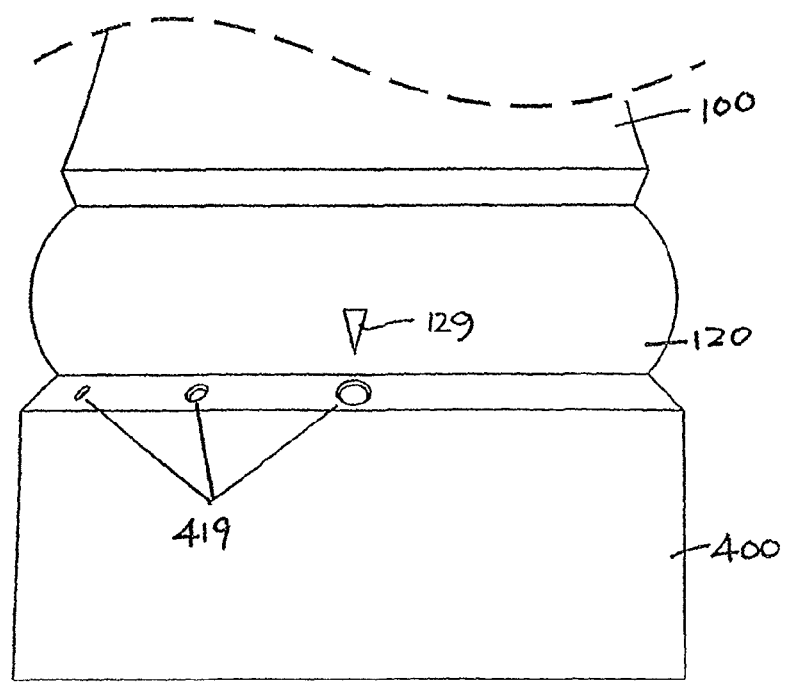
FIGS. 17 and 17A are an elevational side view and a cross-sectional side view of the bottom of the grinder of FIG. 1, with the base turned for fine grinding.
Figure 17A:
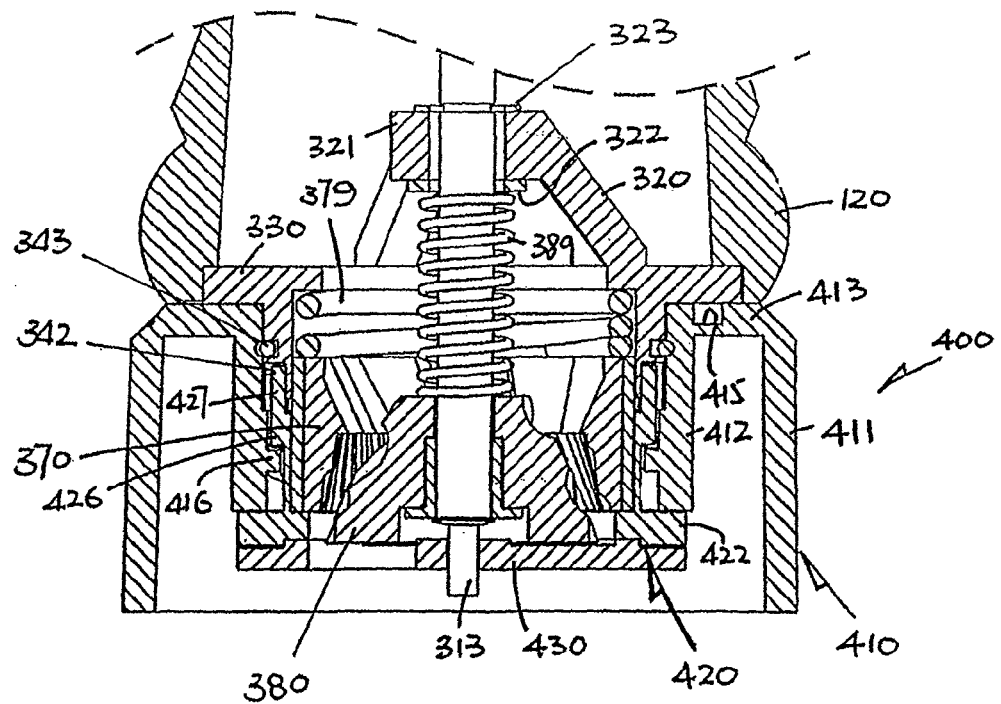

The four recesses 417 of either series define respective perceptible angular positions of the base 400 relative to the grinder body 100 that can be felt, which correspond to gradually changing pepper grinding sizes. The bottom body end 120 includes a marker 129 on its outer surface adjacent the base 400, and the outer surface of the base 400 right below the marker 129 is marked with indicia, such as a series of four dots 419 of increasing size as shown, to indicate the four predetermined positions of the base 400 and hence pepper grinding sizes from the finest (FIGS. 16 and 16A) to the coarsest (FIGS. 17 and 17A).

The base 400 and in particular its outermost peripheral wall 411 is exposed to and is accessible from all lateral sides for being conveniently gripped and rotated to adjust the pepper grinding size. Its position, i.e. at the bottom of the grinder body 100, is particularly convenient for use as the grinder body 100 is usually gripped by the left hand and the person only needs to shift his/her left hand down to hold the base 400 alone for adjustment, with the right hand originally on the grinding knob 200 stretched to grab also the grinder body 100 by its top end 110.

The bottom end 312 of the shaft 310 supporting the male grinder 380 has an axial knob in the form of a narrower post 313 extending beyond the male grinder 380. A disc bearing 430 is secured (for example by glue) co-axially onto the bottom flange 422 of the inner base ring 420 and is disposed about the post 313. The bearing 430 supports and keeps the bottom shaft end 312 at centre, thereby maintaining the male grinder 380 centrally inside the female grinder 370 to prevent wearing out by direct contact and to provide a balanced and thus smooth grinding operation.

The female and male grinders 370 and 380 are both floating (i.e. not fixed in vertical position), being resiliently biased downwards by respective springs 379 and 389. This arrangement allows some degree of freedom for each grinder 370/380 to maneuver, thereby reducing the risk of jamming.

The grinding mechanism 300 of such a rotary type offers an effective grinding action and the inner/outer grinders 380/370 have a robust and durable construction.

It is envisaged that, in an alternative embodiment, the male grinder 380 (rather than the female grinder 370) may be movable by an inner member of the base 400, which may operate in a similar way as the present inner ring 420 but has been altered for example to include a central JO boss supporting the male grinder 380 from below.

The invention has been given by way of example only, and various other modifications and/or variations to the described embodiment may be made by persons skilled in the art without departing from the scope of the invention as specified in the accompanying claims.

The invention claimed is:

1. A condiment grinder comprising:
a body for containing condiment seeds;
a grinding mechanism located at an open end of the body, through which condiment seeds ground by the grinding mechanism may be dispensed, the grinding mechanism comprising
an operating shaft,
a female grinder, and
a male grinder which is supported co-axially in the female grinder for rotation relative to the female grinder for grinding condiment seeds, the female and male grinders being spaced apart by an annular gap in which condiment seeds are ground;
a base attached to the open end of the body, wherein
the open end is a lower end of the body, for standing the body on a surface,
the base is in engagement with one of the female and male grinders and is turnable to adjust axial position of one of the male and female grinders relative to the other of the male and female grinders, size of the annular gap, and size of ground condiment seeds,
the male and female grinders are both resiliently biased toward the base,
the base is in engagement with one of the male and female grinders from below, against the resilient bias acting upon the one of the male and female grinders that is engaged by the base, and
the base has a peripheral portion that is exposed to and accessible for gripping so that the base can be turned; and
a drive mechanism for turning the operating shaft to operate the grinding mechanism, the drive mechanism comprising
an operator supported for reciprocating motion relative to the body, and
a motion translator for translating the reciprocating motion into uni-directional rotary motion driving the operating shaft.

2. The condiment grinder as claimed in claim 1, wherein the motion translator comprises
a rotary member in engagement with the operating shaft for simultaneous rotation of the rotary member and the operating shaft, and
a slider reciprocated by the operator to turn the rotary member and, hence, to turn the operating shaft.

3. The condiment grinder as claimed in claim 2, wherein the slider is slidable along a substantially linear path.

4. The condiment grinder as claimed in claim 2, including a spring resiliently biasing the slider towards a normal position, which corresponds to a position of the operator that is remote from the body.

5. The condiment grinder as claimed in claim 2, wherein the rotary member comprises a wheel.

6. The condiment grinder as claimed in claim 2, wherein the motion translator includes an intermediate member in engagement with and between the slider and the rotary member, the intermediate member being rotatable to transmit motion from the slider to the rotary member.

7. The condiment grinder as claimed in claim 6, wherein the intermediate member has a center of rotation and is, at an off-center position of the intermediate member, in a sliding hinge engagement with the slider.

8. The condiment grinder as claimed in claim 7, wherein the slider has a slot and the intermediate member has an off-center pin in sliding engagement with the slot.

9. The condiment grinder as claimed in claim 6, wherein the intermediate member is rotatable about the same axis as the rotary member.

10. The condiment grinder as claimed in claim 6, wherein the intermediate member includes at least one pawl co-operable with the rotary member to hold and turn the rotary member in only one direction, through a ratchet action.

11. The condiment grinder as claimed in claim 10, including a spring resiliently biasing the at least one pawl resiliently against the rotary member, the spring being located on or in the intermediate member.

12. The condiment grinder as claimed in claim 10, wherein the intermediate member includes two pawls on opposite sides of the rotary member for holding and the rotary member in a balanced manner during turning.

13. The condiment grinder as claimed in claim 6, wherein the rotary member is located and supported for rotation within the intermediate member, the rotary member and the intermediate member, together, being a unitary structure.

14. The condiment grinder as claimed in claim 6, including a first ratchet between the operator and the intermediate member and a second ratchet between the intermediate member and the rotary member, the first and second ratchets being operable in opposite senses.

15. The condiment grinder as claimed in claim 2, wherein the motion translator includes a ratchet stopping the rotary member from turning in an opposite direction from the operating shaft.

16. The condiment grinder as claimed in claim 2, wherein the rotary member includes teeth for ratchet action.

17. The condiment grinder as claimed in claim 2, wherein the operator is supported for reciprocating pivotal motion that operates the grinding mechanism.

18. The condiment grinder as claimed in claim 17, wherein the operator is pivotable towards and away from the body, and is biased toward a normal position remote from the body.

19. The condiment grinder as claimed in claim 17, wherein the operator is pivotably connected to a closure that closes the open end of the body.

20. The condiment grinder as claimed in claim 17, wherein the operator is hinged to the slider for sliding the slider.

21. The condiment grinder as claimed in claim 1, including a lock located between the body and a closure for the open end of the body, locking the closure closed.

22. The condiment grinder as claimed in claim 1, including first and second coil springs respectively resiliently biasing the male and female grinders.

23. The condiment grinder as claimed in claim 1, wherein the base is in engagement with the female grinder and, upon rotation, moves the female grinder relative to the male grinder.

24. The condiment grinder as claimed in claim 1, wherein the peripheral portion comprises a cylindrical wall of the base.

25. The condiment grinder as claimed in claim 1, wherein
the base comprises an annular outer member including the peripheral portion and an annular inner member surrounded by the annular outer member and engaging one of the male and female grinders, and the inner member is axially movable through a cam action by the outer member upon turning of the annular outer member.

26. The condiment grinder as claimed in claim 25, wherein the annular outer and inner members are in engagement by screw thread means.

27. The condiment grinder as claimed in claim 26, wherein the annular outer and inner members have respective screw threads for engaging each other, and the screw threads include inter-engageable parts defining a plurality of predetermined angular positions for the base relative to the body.

28. The condiment grinder as claimed in claim 27, wherein the inter-engageable parts comprise a protrusion and a series of recesses corresponding to the predetermined angular positions.

29. The condiment grinder as claimed in claim 27, wherein the base and the body include respective indicia indicating the predetermined positions.

30. The condiment grinder as claimed in claim 27, wherein the base has four equiangular predetermined positions relative to the body.

31. The condiment grinder as claimed in claim 25, wherein the annular inner member receives and supports the female grinder for movement of the female grinder relative to the male grinder.

32. The condiment grinder as claimed in claim 25, wherein the annular outer member includes an outer cylindrical wall as the peripheral portion and an inner cylindrical wall in engagement with the annular inner member.

33. The condiment grinder as claimed in claim 1, including a mount secured across the lower end of the body, connecting the base to the body and supporting the operating shaft of the grinding mechanism in the body, wherein the operating shaft engages the male grinder for rotating the male grinder.

34. The condiment grinder as claimed in claim 33, wherein the mount and the base have confronting cylindrical surfaces including a pair of aligned annular grooves that are engaged via a ring.

35. The condiment grinder as claimed in claim 33, wherein the operating shaft has a lower end extending beyond the male grinder and supported by a bearing that is secured to an axially movable inner member of the base.

36. The condiment grinder as claimed in claim 1, wherein the base is turnable relative to the body through an angle of about 90°.

\* \* \* \* \*